(12) United States Patent
Bargende

(10) Patent No.: US 11,796,016 B2
(45) Date of Patent: Oct. 24, 2023

(54) SHAFT LOCK

(71) Applicant: SKF MARINE GMBH, Hamburg (DE)

(72) Inventor: Dirk Bargende, Elmshorn (DE)

(73) Assignee: SKF MARINE GMBH, Hamburg (DE)

( * ) Notice: Subject to any disclaimer, the term of this patent is extended or adjusted under 35 U.S.C. 154(b) by 0 days.

(21) Appl. No.: 17/770,190

(22) PCT Filed: Nov. 9, 2020

(86) PCT No.: PCT/EP2020/081490
§ 371 (c)(1),
(2) Date: Apr. 19, 2022

(87) PCT Pub. No.: WO2021/094254
PCT Pub. Date: May 20, 2021

(65) Prior Publication Data
US 2022/0389977 A1    Dec. 8, 2022

(30) Foreign Application Priority Data
Nov. 11, 2019 (DE) .......................... 102019217384.5

(51) Int. Cl.
*F16D 43/208* (2006.01)

(52) U.S. Cl.
CPC ................... *F16D 43/208* (2013.01)

(58) Field of Classification Search
CPC .................. F16D 43/208; F16D 2041/0646
See application file for complete search history.

(56) References Cited

U.S. PATENT DOCUMENTS

| | | | | |
|---|---|---|---|---|
| 3,770,086 A | * | 11/1973 | Jackson | B66D 5/12 192/16 |
| 4,102,154 A | | 7/1978 | Dahlstrand | |
| 4,744,447 A | * | 5/1988 | Kato | F16D 43/208 464/30 |
| 7,367,891 B2 | * | 5/2008 | Bae | F16D 7/10 464/41 |
| 11,597,063 B2 | * | 3/2023 | Witte | F16D 7/10 |

FOREIGN PATENT DOCUMENTS

| | | |
|---|---|---|
| CN | 101639103 A | 2/2010 |
| WO | 2018144185 A1 | 8/2018 |

OTHER PUBLICATIONS

English translation of the Written Opinion of the International Searching Authority in parent application No. PCT/EP2020/081490.

English translation the International Search Report dispatched May 20, 2021 for parent application No. PCT/EP2020/081490.

\* cited by examiner

*Primary Examiner* — Huan Le
(74) *Attorney, Agent, or Firm* — J-TEK LAW PLLC; Scott T. Wakeman; Mark A. Ussai

(57) ABSTRACT

A shaft lock includes a radially inner rotor part that is coaxially connected to a shaft having a rotational axis and a fixed stator part that at least partially encloses the rotor part. In a locking state and in a holding state, an interference-fit connection between the rotor part and the stator part is produced by a plurality of locking bodies, and the interference-fit connection is cancelable by a transition into an unlocking state. To produce the interference-fit connection, each of the plurality of locking bodies are partially engageable in an interference-fit manner in a respective receiving geometry of the rotor part by rotation of a substantially hollow-cylindrical locking ring that coaxially encloses the stator part in a partially radially outer-lying manner.

14 Claims, 3 Drawing Sheets

SHAFT LOCK

CROSS-REFERENCE

This application is the U.S. National Stage of International Application No. PCT/EP2020/081490 filed on Nov. 9, 2020, which claims priority to German patent application no. DE 10 2019 217 384.5 filed on Nov. 11, 2019.

TECHNOLOGICAL FIELD

The present disclosure is directed to a shaft lock including a radially inner-lying rotor part that is centrally connected to a shaft having a rotational axis, wherein the shaft and the radially inner-lying rotor part are coaxially enclosed at least partially by a fixed and radially outer-lying stator part.

Locks for blocking a rotational movement of a shaft as necessary, and to release it again as required, are known from the prior art in wide range of variations. A mechanical lock is used here, for example, using additional hydraulic locking cylinders. Furthermore, force-type-fit or friction-fit rotational locks are known using extendable threaded bars and brake disks. In addition, interference-fit rotational locks are used that use locking pins, extendable wedges, bars, pins, as well as toothings. Furthermore, rotational locks of a shaft with the aid of self-locking transmissions, such as, for example, screw transmissions, are known.

SUMMARY

An aspect of the present disclosure is to, inter alia, specify provide a constructively simply built, spatially compact shaft lock with extensive use of standard machine components, which makes possible a transmission of high mechanical moments with a minimal rotational clearance.

This is achieved by an interference-fit connection using a plurality of locking bodies between the radially inner-lying rotor part and the fixed and radially outer-lying stator part. The interference-fit connection is present in a locking state and in a holding state, and the interference-fit connection is cancellable for the transition into an unlocking state.

Using at least one actuating member to produce or cancel the interference-fit connection, the locking bodies are partially engageable regionally in an interference-fit manner into a respective receiving geometry of the radially inner-lying rotor part. Consequently an interference-fit connection between the rotor part, the locking bodies and the stator part is producible and releasable again as needed. In the case of, for example, spherical locking bodies, the receiving geometries are configured as calotte-shaped depressions, and in the case of, for example, cylindrical or roller-shaped locking bodies, the receiving geometries are configured as axial longitudinal grooves. Both the calotte-shaped depressions and the longitudinal grooves each have an essentially circle-segment-shaped cross-sectional geometry, into which the locking bodies are engageable at most halfway.

The at least one actuating member is configured as an essentially hollow-cylindrical locking ring that coaxially partially encloses the fixed and radially inner-lying stator part radially on the outside. A particularly space-saving, robust, and cost-effective-to-produce construction of the shaft lock is thereby ensured.

Consequently at least the locking or the unlocking, as well as the renewed enabling of a rotational movement of the shaft, are possible. An axial locking of the shaft is also realizable as required. In addition, using the compact and robust shaft lock, high torques are transmissible with a low installation-space requirement. Due to the interference-fit connection, there is no energy requirement in the holding state, in the locking state, or in the unlocking state. The use of energy is necessary only during shifting between the three states of the shaft lock. A rotational angle position of the locking or holding position of the shaft lock can be freely set during the assembling of the target application. Here the rotational angle position can be adjusted in a very fine resolution that is constructively easily selectable beforehand. In the unlocking state, the inventive shaft lock is contact-free and tolerant with respect to misalignments in the form of radial and angular offsets. Furthermore, due to the freedom from contact in the unlocking state, no operation-related heat arises. Furthermore, a small rotational clearance is ensured in the holding and locking state. Here the shaft lock can be manufactured cost-effectively with conventional standard elements of machine construction.

The interference-fit connection between the fixed and radially outer stator part, and the rotor part including the shaft, is preferably configured such that the stator part and the rotor part do not rotate together, or that they do not rotate together and do not slide with respect to each other.

Consequently the shaft can also be locked in the axial direction with respect to the radially outer-lying stator part.

In one technically advantageous design, the locking bodies are preferably positioned uniformly distributed around the circumference.

A uniform force and moment distribution is thereby set inside the shaft lock.

In the case of a further advantageous design, the locking bodies are configured cylindrical or spherical.

Consequently the shaft lock can be shifted fluidly and smoothly between the unlocking state, the locking state, and the holding state. In addition, surface-processed cylinders or rollers or balls represent particularly cost-effective standard components of machine construction.

In one advantageous design it is provided that the receiving geometries of the radially inner-lying rotor part each have a cross-sectional shape that corresponds approximately to a circle section whose height is smaller than a radius of the locking bodies.

Consequently during changing into the unlocking state, the locking bodies can again easily be lifted from the rotor part, since an equatorial plane or a central plane of the locking body extends above an outer casing surface of the rotor part. Consequently under no circumstances are the locking bodies engageable more than halfway into the respective associated receiving geometry of the rotor part.

In one technically favorable refinement, the fixed and radially inner-lying stator part includes a plurality of radially continuous openings, wherein a locking body is regionally received in an interference-fit manner in each opening.

Consequently, using the locking ring the locking bodies can be actuated from outside with the aid of the locking ring and thus engage directed radially inwardly.

According to a further advantageous design, a cylindrical inner surface of the locking ring includes a plurality of radially inwardly directed receiving pockets, each one for a locking body, wherein each receiving pocket includes a radially inwardly inclined slip incline.

A radially inwardly directed displacing movement of the locking bodies having a high axial force effect due to the rotating of the locking ring is thereby realizable.

A recessed, fillet-type end section preferably connects to each slip incline in the region of which end section a retaining element, in particular a permanent magnet, is disposed in the unlocking state for position-fixing of a locking body inside a respective associated receiving pocket of the locking ring.

In the unlocking state of the shaft lock, a reliable positional securing and a defined position of the locking bodies are thereby ensured.

In one advantageous further refinement, it is provided that each slip incline includes a further end section directed circumferentially away from the recessed, fillet-type end section to which further end section a retaining surface embodied concentric with the rotational axis connects circumferentially.

Due to the retaining surfaces of the slip inclines, which retaining surfaces extend essentially tangentially with respect to the inner surface of the locking ring, a circumferential displacing of the locking bodies is precluded so that the shaft lock cannot unintentionally release.

In the unlocking state of the shaft lock, each locking body is preferably respectively held by a retaining element in the respective associated recessed fillet-type end section of the slip incline such that the receiving geometries of the rotor part are free from locking bodies, and the locking bodies lie far enough radially outward that they end at most flush with a cylindrical inner surface of the stator part, and the rotor part together with the shaft can freely rotate in relation to the stator part.

The freedom from mechanical contact or the freedom from friction between the rotor part and the stator part is thereby ensured in the unlocking state of the shaft lock.

In a further design of the shaft lock, it is provided that by the rotating of the locking ring in a locking direction, the locking bodies are displaceable by the slip inclines radially inward out of the openings of the stator part, and each locking body is thereby engageable less than halfway into a respective associated receiving geometry of the rotor part, and the locking state of the shaft lock is produced in which a rotating, in relation to the stator part, of the rotor part including the shaft is blocked.

A robust and also mechanically highly loadable blocking of a rotational movement in relation to the stator part of the shaft including the rotor part is thereby provided.

With a further rotating of the locking ring in the locking direction, each locking body preferably comes into abutment against the respective associated retaining surface of the receiving pocket, and the holding state of the shaft lock is achieved by an unintended releasing of the interference-fit connection between the rotor part including the shaft and the stator part being precluded.

An unintended releasing of the locking of the shaft is thereby reliably precluded in the holding state.

BRIEF DESCRIPTION OF THE DRAWINGS

In the following, a preferred exemplary embodiment of the invention is explained in more detail with reference to schematic Figures.

DETAILED DESCRIPTION

Figure 1:
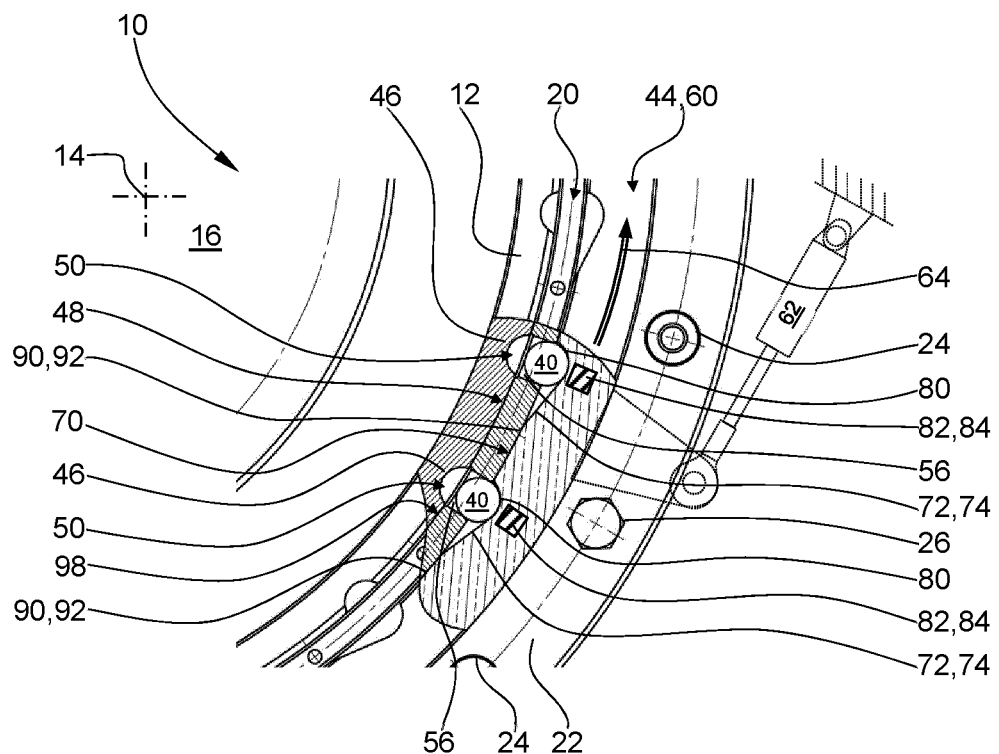
FIG. 1 shows a partially truncated partial plan view of an inventive shaft lock in an unlocking state.

FIG. 1 shows a partially truncated partial plan view of an inventive shaft lock in an unlocking state.

A shaft lock 10 first comprises a radially inner-lying rotor part 12 that is centrally connected to a shaft 16 having a rotational axis 14. The mechanically high-strength connection between the shaft 16 and the rotor part 12 of the shaft lock can be realized, for example, with the aid of a screw-clamp coupling not depicted here, by thermal shrinking-on, a feather-key connection, or the like. The rotor part 12 has an essentially hollow-cylindrical geometry. The shaft 16, including the radially inner-lying rotor part 12 attached thereto, is at least partially coaxially enclosed by a fixed or stationary and radially outer stator part 20. The stator part 20, also having essentially an essentially hollow-cylindrical geometry, includes a circular-ring-shaped attachment flange 22 directed radially outward or oriented perpendicular to the rotational axis 14. A plurality of through-bores, preferably disposed spaced uniformly circumferentially, for attachment means 26, such as screws, bolts, etc., is introduced into the attachment flange 22. Due to the attachment means 26, the stator part 20 is connected to a not-depicted stationary abutment, such as, for example, a hull structure of a ship, a transmission flange, or the like.

In a locking state as well as in a holding state of the shaft lock 10, there is an interference-fit connection (see FIG. 2, 3; reference number 30), by a plurality of locking bodies 40, preferably disposed uniformly spaced circumferentially with respect to one another, between the radially inner-lying rotor part 12 and the fixed and radially outwardly positioned stator part 20. In the depiction of FIG. 1, the shaft lock 10 is located in an unlocking state, in which the interference-fit connection between the rotor part 12 and the stator part 20 is released and the shaft 16 including the rotor part 12 can rotate freely and in a manner practically free of resistance in relation to the stator part 20. Here the interference-fit connection between the fixed and the radially outer-lying stator part 20 and the rotor part 12 can be designed such that they do not rotate together or also such that they do not rotate together and do not slide with respect to each other.

For producing or cancelling of the interference-fit connection, using at least one actuation member 44 the constructively identical locking bodies 40 are each at most partially pushable into an associated peripheral receiving geometry 46 of an outer casing surface 48 of the rotor part 12. The locking bodies 40 can be embodied, for example, spherical, or essentially cylinder or roller shaped, or roller shaped. The locking bodies 40 can also have a polygonal cross-sectional geometry and be configured, for example, in the manner of feather keys. Depending on the shape of the locking bodies 40, the constructively respectively identical receiving geometries 46 of the rotor part 12 can be embodied, for example, as calotte-shaped depressions or as longitudinal grooves in the outer casing surface 48 of the rotor part 12. In the exemplary embodiment illustrated here of the shaft lock 10, the locking bodies 40 are only designed cylindrical or roller-shaped, from which a reduced surface pressing, in comparison to spherical locking bodies, is to be achieved during a transfer of high torques via the shaft lock 10. Consequently the receiving geometries 46 are embodied here as longitudinal grooves, not indicated here for the sake of better illustration clarity, extending parallel to the rotational axis 14. Depending on whether a one-side or both-sides axial-displacement-free locking of the shaft 16 is desired, the longitudinal grooves can be embodied axially continuous, or open both sides, or closed one-side or both-sides. For regional interference-fit receiving, the longitudinal grooves have a cross-sectional geometry that essentially corresponds to that of a circle section or that is embodied complementary to the cross-sectional geometry of the locking bodies 40.

Both in the locking state and in the holding state of the shaft lock 10, each locking body 40 is regionally received in a receiving geometry 46 of the rotor part 12. The receiving geometries 46 of the rotor part 12 each have a cross-sectional shape 50 that corresponds approximately to a circle section or circle segment, not indicated here, whose height, also not indicated here, is smaller than a radius, not provided with a number here, of the locking bodies 40, so that due to the then-not-present undercut, the locking bodies 40 can be easily moved radially outward from the receiving geometries 46 (see FIG. 4).

The stator part 20 includes a plurality of radially continuous, constructively identical openings 56 that are disposed uniformly circumferentially spaced with respect to each other and that—as shown here—at least for the transition from the unlocking state into the locking state or holding state, are completely covered by the respective associated receiving geometries 46 of the rotor part 12.

A locking body 40 is respectively at least in regions received in an interference-fit manner in each of the openings 56 of the stator part 20. Depending on whether the locking bodies 40 are configured spherical or cylindrical, the openings 56 are embodied as radially continuous bores, or as slots or longitudinal slits extending parallel to the rotational axis 14.

Here the actuating member 44, merely by way of example, is formed with an essentially hollow-cylindrical locking ring 60 that coaxially encloses the fixed and radially inner-lying stator part in a partially radially outer-lying manner. To change from the unlocking state shown in FIG. 1 into the locking state or into the holding state of the shaft lock 10 (see FIGS. 2, 3), the locking ring 60 is rotatable in a locking direction 64 using a suitable actuator 62 that is merely implicit in the drawing. By the rotating of the locking ring 60 in a not-marked unlocking direction opposing the locking direction 64, the change from the holding state into the unlocking state is effected as needed.

A plurality of radially inwardly directed, respectively constructively identical receiving pockets 72, each for a locking body 40, is embedded in a cylindrical inner surface 70 of the locking ring 60, wherein each receiving pocket 72 includes a radially inwardly directed slip incline 74. Each slip incline 74 includes a recessed, fillet-type end section 80 in which a locking body respectively abuts in regions in the unlocking state shown here of the shaft lock 10. In the unlocking state, in order to reliably hold the locking bodies in the fillet-type end section 80 associated with each one, a retaining element 82 is respectively provided in the region of each fillet-type end section 80. The same applies to all further not-depicted fillet-type end sections of the other receiving pockets. The retaining elements 82 are preferably each realized with a permanent magnet 84. Alternatively mechanical retaining elements, such as, for example, retaining clips, etc., can also be provided. Each slip incline 74 further includes a further circumferential end section 90 directed away from the respective associated fillet-type recessed end section 80, to each of which further end section 90 the retaining surface 92 embodied concentrically with the rotational axis 14 connects circumferentially.

Here the retaining surfaces 92 extend merely by way of example essentially tangential to the approximately cylindrical—up to the receiving pockets—inner surface 70 of the locking ring 60. The retaining surfaces 92 can optionally also be formed co-radial, i.e., cylindrical with respect to the inner surface 70 of the locking ring 60.

In the unlocking state illustrated here of the shaft lock 10, each locking body 40 is reliably retained by a respective associated retaining element 82 in the respective associated recessed fillet-type end section 80 of the respective slip incline 74. Consequently the receiving geometries 46 of the rotor part 12 are free of locking bodies 40, and these lie so far outward radially that they end at most flush with the cylindrical inner surface 98 of the stator part 20 or do not protrude past these inwardly, so that in the unlocking state the rotor part 12, together with the shaft 16 attached thereto, can rotate in a practically friction-free manner in relation to the stator part 20.

Figure 2:
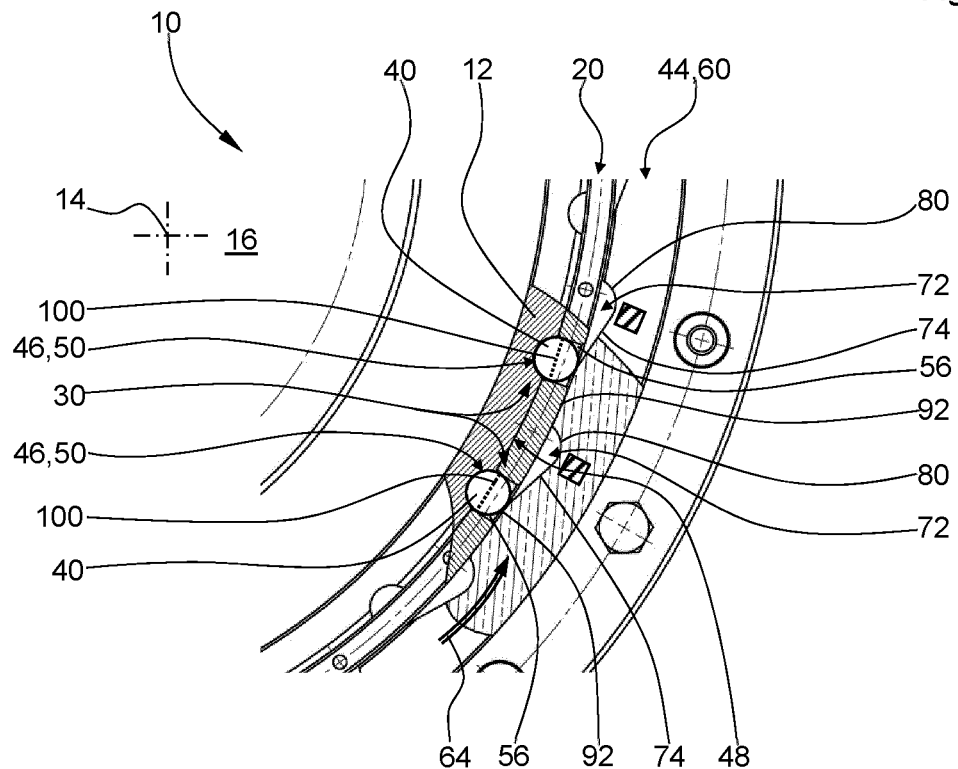
FIG. 2 shows a partially truncated partial plan view of the shaft lock of FIG. 1 in a locking state.

FIG. 2 illustrates a partially truncated partial plan view of the shaft lock of FIG. 1 in a locking state.

The shaft lock 10 in turn comprises the rotor part 12, the stator part 20, as well as the actuating member 44 configured as locking ring 60, which are disposed concentric with the rotational axis 14 of the shaft 16. For better illustrative overview, the actuator of FIG. 1 is no longer depicted here and in all further Figures.

By the rotating of the locking ring 60 in the direction of the locking direction 64, the locking bodies 40 have moved out from the fillet-type end sections of the receiving pockets 72 of the locking ring 60, and circumferentially have run close to the slip inclines 74 up to the retaining surfaces 92. Due to the radially inwardly directed inclination of the slip inclines 74, a displacing movement of the locking bodies 40, radially inward with respect to the rotational axis 14, is effected such that the locking bodies 40 are partially pushed out from the openings 56 of the stator part 20, and are embedded in the respective associated receiving geometry 46 of the rotor part 12, whereby the interference-fit connection 30 is provided between the rotor part 12 and the stator part 20.

An equatorial plane 100 of the locking body 40 always remains radially outside or radially above the outer casing surface 48 of the rotor part 12, so that during a change in the unlocking state of FIG. 1 the locking bodies 40 can easily move out from the receiving geometries 46 of the rotor part 12. This is achieved by the cross-sectional shape 50 of the receiving geometries 46 being respectively smaller than a semicircle or having the shape of a circle section.

By the rotating of the locking ring 60 in the locking direction 64, with the aid of the slip inclines 74 the locking bodies 40 are displaceable radially inward with respect to the rotational axis 14 out of the openings 56 of the stator part 20 so that the locking bodies 40 are each embedded less than halfway into a respective associated receiving geometry 46 of the rotor part 12 while providing the interference-fit connection, and the locking state of the shaft lock 10 is achieved. In the locking state, any rotation of the rotor part 12 including the shaft 16 in relation to the stator part 20 is reliably blocked even under the influence of high and extremely high torques.

Figure 3:
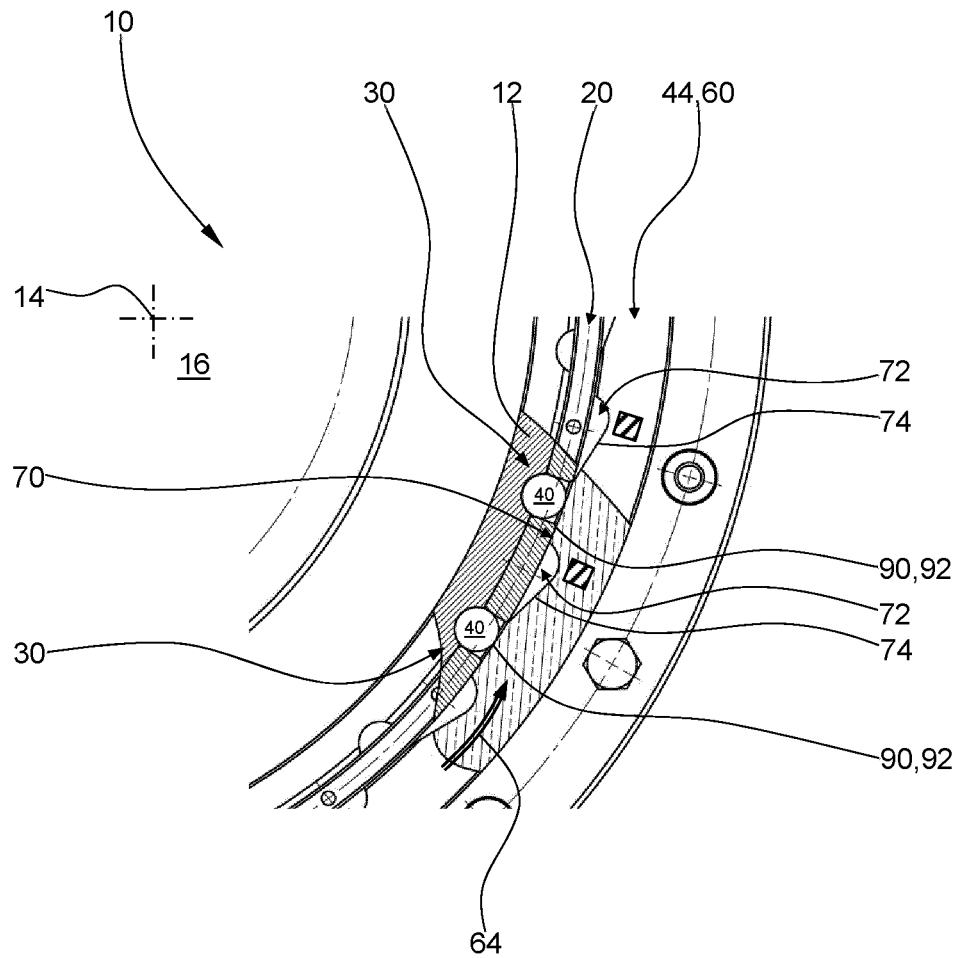
FIG. 3 shows a partially truncated partial plan view of the shaft lock of FIG. 1 in a holding state.

FIG. 3 shows a partially truncated partial plan view of the shaft lock of FIG. 1 in a holding state.

The shaft lock 10 formed rotationally symmetric with respect to the rotational axis 14 in turn comprises the shaft 16 including the rotor part 12 attached thereto, the stator part 20, and the actuating member 44 configured as locking ring 60. By the further rotating of the locking ring 60 starting from the locking state in FIG. 2 in the orientation of the locking direction 64, the locking bodies 40 slide up to the retaining surfaces 92 of the further end section 90 of the slip inclines 74 of the receiving pockets 72 of the locking ring. Due to the retaining surfaces 92 extending essentially coaxially with the rotational axis 14 of the essentially cylindrical—up to the receiving pockets 72—inner surface 70 of the locking ring 60, an unintended shifting of the shaft lock 10 from the retaining state into the locking or the unlocking state is precluded. In addition, each of the retaining surfaces 92 can be provided with a not-depicted, small, trough-type recess and/or a slight bead-type thickening that prevents a movement of the locking bodies 40 back up into the region of the respective associated slip incline 74 of the receiving pocket 72, without active actuating of the locking ring 60, so that a self-locking of the shaft lock 10 is reliably precluded. However, due to optional thickenings or depressions the clearance of the locking bodies 40 usually increases, and consequently a rotational clearance of the locking shaft 16 increases.

In the holding state, shown here, of the shaft lock 10, the interference-fit connection 30 between the rotor part 12 and the stator part 20 remains unchanged until the rotating of the locking ring 60 counter to the locking direction 64.

By a rotational movement of the locking ring 60 counter to the locking direction 64, starting from the holding state illustrated here, as needed the shaft lock can in in turn be set back into the locking state of FIG. 2, and by further rotating into the unlocking state of FIG. 1. To release the locking bodies 40 from their respective associated receiving geometries 46 of the rotor 12, a slight and momentary advancing rotational movement between the rotor part 12 and the stator part 20 may be necessary against or in the direction of the orientation of the locking direction 64. To release the locking bodies 40, the locking ring 60 must basically be rotated against the locking direction 64 up to into the position of FIG. 1, or "opened," so that the shaft lock 10 is in turn located in the unlocking state.

Figure 4:
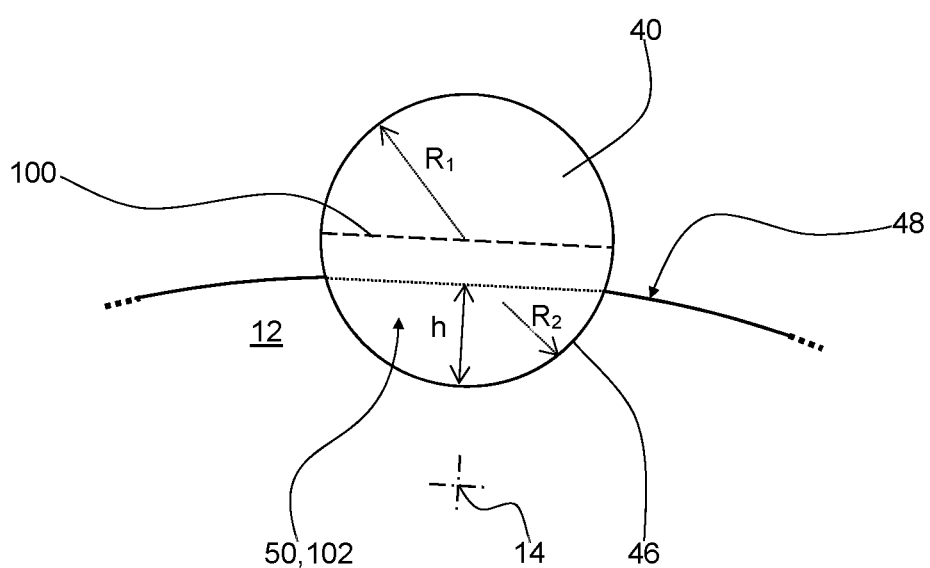
FIG. 4 shows an enlarged schematic depiction of a cross-sectional geometry of a receiving geometry of a rotor part including a cylindrical locking body received therein in a regionally interference-fit manner.

FIG. 4 shows an enlarged schematic cross-sectional depiction of a receiving geometry of a rotor part including a cylindrical locking body received in regions therein in an interference-fit manner.

A plurality of receiving geometries for the locking bodies is formed in the rotor part 12, of which only one locking body 40 received in regions in the receiving geometry 46 in an interference-fit manner is depicted as representative for all further locking bodies and receiving geometries. The locking body 40 has an essentially cylindrical shape having a radius $R_1$, wherein to ensure the regional interference fit the radius $R_1$ corresponds to a radius $R_2$ of the calotte-shaped receiving geometry 46. The receiving geometry 46 has a cross-sectional shape 50 that corresponds approximately to that of a circle section 102 or that of a circle segment having a height h. The equatorial plane 100 or the central plane of the locking body 40 extends above or radially outward with respect to the outer casing surface 48 of the rotor part 12 or of the rotational axis 14, so that in every case the locking body 40 is received less than halfway in an interference-fit manner into the receiving geometry 46 of the rotor part 12. Corresponding considerations apply for the case that the locking body 40 is embodied spherical.

Figure 5:
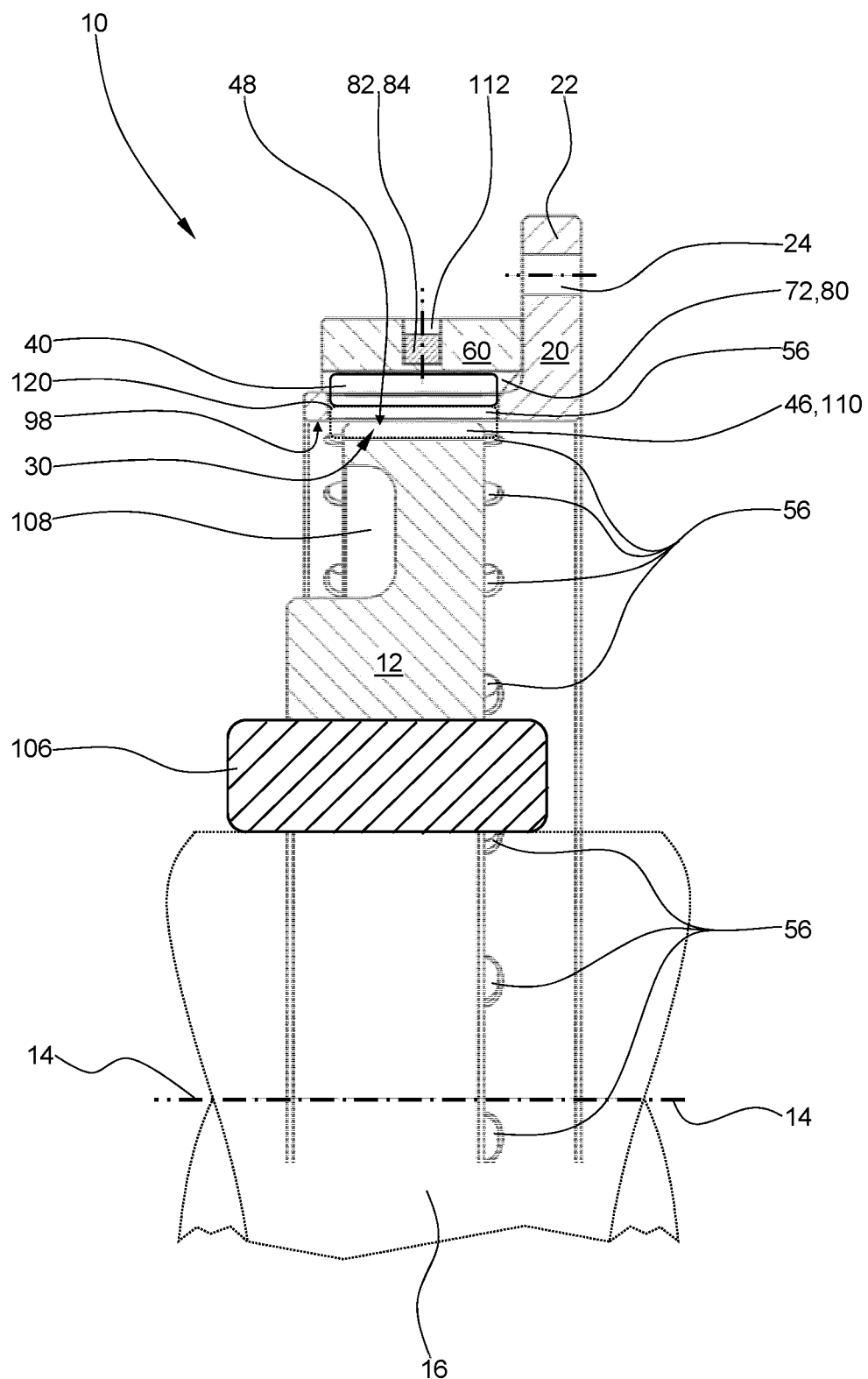
FIG. 5 shows a longitudinal section through the shaft lock of FIG. 1.

FIG. 5 shows a longitudinal section through the shaft lock of FIG. 1.

Using a graphically merely implicit screw-clamp coupling 106, the hollow-cylindrical rotor part 12 of the shaft lock 10 is connected to the shaft 16 having the rotational axis 14 such that they do not rotate together and do not slide with respect to each other. The rotor part 12 includes an encircling ring groove 108 having an approximately trough-shaped cross-sectional geometry to save weight. The receiving geometries are formed on the outer casing surface 48 of the rotor part 12, only one receiving geometry 46 of which is depicted here. In the exemplary embodiment depicted here, the receiving geometry 46 is formed with a both-sides-open or axially continuous longitudinal groove 110 so that the shaft lock 10 makes possible only the locking of the shaft 16 including the rotor part 12 inside the radially outer-lying stator part 20, whereas a displacement-free locking of the shaft 16 is not provided. The stator part 20 further includes the radially outwardly directed attachment flange 22, including a plurality of bores extending parallel to the rotational axis 16 and uniformly spaced with respect to one another circumferentially, of which only one bore 24 for mechanical connecting of the shaft lock 10 to a not-depicted abutment, representative for all others, is depicted and indicated. The retaining element 82 configured as permanent magnet 84 is attached inside the locking ring 60 in an essentially radially inwardly directed blind bore 112. Accordingly for each further locking body not depicted here, the locking ring 60 includes a further permanent magnet as retaining element.

In the unlocking state illustrated here of the shaft lock 10, the essentially cylindrical locking body 40, represented by a continuous black line, is attracted by the permanent magnet 84 and is thereby securely positionally fixed inside the associated receiving pocket 72. The locking body 40 abuts against the fillet-type end section 80 of the receiving pocket 72 so that the locking body 40 is only partially received in the opening 56 of the stator part 20 and the receiving geometry 46 is completely free from the locking body 40. The locking body 40 lies radially outward with respect to the cylindrical inner surface 98 of the stator part 20 so that the rotor part 12 can rotate, practically free from resistance, in relation to the stationary stator part 20. Here the openings 56 have an approximately oval slot geometry, since the locking bodies have an essentially cylindrical shape, so that the locking bodies can shift inside the openings of the stator part essentially only radially inward and outward with respect to the rotational axis 14. Axial movements, shear movements, and/or tilting movements of the locking bodies with respect to the stator part 20 are essentially precluded due to the guiding in the openings of the stator part 20.

If the locking body 40 is displaced by the rotating of the locking ring 60 radially inward—as is graphically indicated by the black dotted outline depiction 120—then the locking body 40 engages partially into the receiving geometry 46 of the rotor part 12, and the desired interference-fit connection 30 is produced between the stator part 20 and the rotor part 12 of the shaft 16, and the shaft lock 10 has assumed the locking state.

By the at least slight further rotating of the locking ring 60 in the same direction, starting from the locking state the shaft lock 10 is displaced further into the holding state.

REFERENCE NUMBER LIST

10 Shaft lock
12 Rotor part
14 Axis of rotation
16 Shaft
20 Stator part
22 Attachment flange
24 Through-bore
26 Attachment means
30 Interference-fit connection 40 Locking body
44 Actuating member
46 Receiving geometry (rotor part)
48 Outer casing surface (rotor part)
50 Cross-sectional shape (rotor part receiving geometry).
56 Opening (stator part)
60 Locking ring
62 Actuator
64 Locking direction
70 Cylindrical inner surface (locking ring)
72 Receiving pocket
74 Slip incline
80 Fillet-type end section (slip incline)
82 Retaining element
84 Permanent magnet
90 Further end section (slip incline)
92 Retaining surface
98 Cylindrical inner surface (stator part)
100 Equatorial plane (central plane locking body)
102 Circle section
106 Screw-clamp coupling
108 Ring groove
110 Longitudinal groove (rotor part)
112 Blind bore
120 Outline depiction (locking body)
$R_1$ Radius (locking body)
$R_2$ Radius (rotor part receiving geometry)
h Height (circle section receiving geometry)

The invention claimed is:

1. A shaft lock including a radially inner-lying rotor part that is centrally connected to a shaft having a rotational axis, wherein the shaft and the radially inner-lying rotor part are at least partially coaxially enclosed by a fixed and radially outer-lying stator part, wherein in a locking state and in a holding state, an interference-fit connection between the radially inner-lying rotor part and the fixed and radially outer-lying stator part is produced by a plurality of locking bodies, and the interference-fit connection is cancelable by a transition into an unlocking state, and wherein to produce or cancel the interference-fit connection, using at least one actuating member, each of the plurality of locking bodies are partially engageable in an interference-fit manner in a respective receiving geometry of the radially inner-lying rotor part, and wherein the at least one actuating member is configured as a substantially hollow-cylindrical locking ring that coaxially encloses the fixed and radially inner-lying stator part in a partially radially outer-lying manner.

2. The shaft lock according to claim 1, wherein the interference-fit connection between the fixed and radially outer-lying stator part and the rotor part including the shaft is non-rotatable or non-rotatable and non-slip.

3. The shaft lock according to claim 1, wherein the plurality of locking bodies are uniformly circumferentially distributed.

4. The shaft lock according to claim 1, wherein the plurality of locking bodies are configured cylindrical or spherical.

5. The shaft lock according to claim 4, wherein the receiving geometries of the radially inner-lying rotor part each have a cross-sectional shape that corresponds to a circle section having a depth smaller than a radius of the plurality of locking bodies.

6. The shaft lock according to claim 4, wherein the fixed and radially inner-lying stator part includes a plurality of radially continuous openings, wherein a respective locking body of the plurality of locking bodies is partially received in each opening in an interference-fit manner.

7. The shaft lock according to claim 1, wherein a cylindrical inner surface of the locking ring includes a plurality of radially inwardly directed receiving pockets, each configured to receive one of the plurality of locking bodies, wherein each receiving pocket includes a radially inwardly inclined slip incline.

8. The shaft lock according to claim 7, wherein a recessed, fillet-type end section connects to each slip incline in the region of which end section a retaining element is disposed in the unlocking state for positional fixing of one of the plurality of locking bodies inside a respective associated receiving pocket of the locking ring.

9. The shaft lock according to claim 8, wherein each slip incline includes a further end section directed circumferentially away from the recessed fillet-type end section, to which a retaining surface embodied concentric with the rotational axis attaches circumferentially.

10. The shaft lock according to claim 8, wherein in the unlocking state of the shaft lock, each of the plurality of locking bodies is respectively held by a retaining element in the respective associated recessed fillet-type end section of the slip incline so that the receiving geometries of the rotor part are free from the plurality of locking bodies, and the plurality of locking bodies lie so far radially outward that they end at most flush with a cylindrical inner surface of the stator part, and the rotor part together with the shaft can rotate freely in relation to the stator part.

11. The shaft lock according to claim 8,
wherein the retaining element comprises a permanent magnet.

12. The shaft lock according to claim 7, wherein by rotating the locking ring in a locking direction, the plurality of locking bodies are displaceable by the slip inclines radially inward from the openings of the stator part and are thereby engageable less than halfway into a respective associated receiving geometry of the rotor part, and the locking state of the shaft lock is produced, wherein a rotating of the rotor part, including the shaft, in relation to the stator part is blocked.

13. The shaft lock according to claim 12, wherein with a further rotating of the locking ring in the locking direction, each of the plurality of locking bodies comes into contact with the respective associated retaining surface of the receiving pocket, and the holding state of the shaft lock is reached in which unintentional loosening of the interference-fit connection between the rotor part with the shaft and the stator part is precluded.

14. A shaft lock comprising:
a radially inner-lying rotor configured to be mounted coaxially to a shaft having a rotational axis, the rotor including a plurality of circumferentially spaced receiving geometries;
a stator mounted around the rotor, the stator including a radially inner portion having a plurality of radial through openings alignable with the plurality of receiving openings;
a plurality of locking bodies, each of the plurality of locking bodies being associated with a respective one of the plurality of receiving geometries, and
a locking ring surrounding the stator and having a plurality of receiving pockets, each of the receiving pockets including a bottom, a permanent magnet at the bottom and a cam surface sloping away from the bottom,
wherein the locking ring is rotatable from a first position to a second position relative to the stator, wherein in the first position, the plurality of locking bodies are held at the bottoms of the plurality of receiving pockets by the permanent magnets such that the plurality of locking bodies extend into the through openings of the stator and do not extend into the receiving geometries of the rotor, and wherein in the second position, portions of the plurality of locking bodies are held in the receiving geometries and in the through openings by the cam surface to form an interference fit between the rotor and the stator.

\* \* \* \* \*